May 6, 1958   C. G. PADEN   2,833,295
DEVICE FOR CLEANSING EGGS IN BULK
Filed Oct. 4, 1955

CHARLES G. PADEN - Inventor

By Charles W. Hull
Attorney

United States Patent Office 2,833,295
Patented May 6, 1958

2,833,295

DEVICE FOR CLEANSING EGGS IN BULK

Charles G. Paden, Harrisburg, Pa., assignor, by mesne assignments, to The Whirl-A-Way Corporation, Harrisburg, Pa., a corporation of Pennsylvania Application October 4, 1955, Serial No. 538,378

1 Claim. (Cl. 134—182)

The present improvements relate to devices for cleaning eggs, and more particularly to a novel washer for cleaning eggs with a liquid detergent.

Reference is made to my earlier patents, No. 2,520,889 of August 29, 1950, and No. 2,576,236 of November 27, 1951, wherein apparatus and methods are outlined for performing the egg cleaning operation by means of a liquid detergent. While devices which have been manufactured and marketed under these patents have proved to be efficient and readily accepted in the trade, there is also a need for a unit of more simplified design.

Accordingly, the present improvements are directed to the production of an efficient egg washing device which not only is economical to manufacture, but which calls for a minimum of maintenance costs without sacrificing the efficiency of the cleaning operation.

A primary object of the present improvements, therefore, is to provide an egg washing device of the tank or cabinet design, which has a minimum of moving parts.

A further object is the provision of mechanical liquid propulsion means in a tank or vessel, in which the eggs may be supported in bulk in a basket, whereby the liquid detergent, which envelops the eggs, is both pulled through and driven through the cluster and reaches the surface of all eggs in all parts of the cluster, while all the eggs are still maintained in an immersed condition.

Another object of the present improvements is the provision of an outer tank or vessel, and a baffle or inner tank wall member which defines an uninterrupted cylindrical annular channel, whereby the liquid detergent may travel therethrough without having its speed or direction impaired or impeded. The provision of an inner tank having an open top and a perforate bottom, mounted in spaced relation to the top, sides and bottom of the outer tank for permitting unrestricted movement of the liquid detergent, constitutes a further object of the invention.

A still further object of the improvements is the provision of a rotatable impeller in a chamber containing the liquid detergent, which upon rotation imparts a rotary or circulatory motion to the liquid. By providing this source of energy immediately beneath the open bottom of the inner tank, the liquid is drawn downwardly through the tank and forced upwardly around its outer sides into the annular channel, and thereupon spirally upwardly and over the top of the inner tank, whereupon it is forcibly cascaded diagonally across the top and down into the inner tank in a swirling, whirlpool motion.

A special feature of the present improvements also consists in the provision of an uninterrupted annular passageway for liquid detergent, said passageway extending to a level above the center of an egg basket for permitting uniform cascading of the detergent about the periphery of the basket.

The provision of means as above described, with concentrically disposed tanks with the inner one having a partially dished bottom, constitutes a further object of the invention.

These and other objects will appear to those skilled in the art, upon reference to the accompanying specification and drawings, in which, Fig. 1 is a vertical section, partly in perspective and in elevation, with parts broken away, illustrating the preferred embodiment of the improvements.

Figure 1:
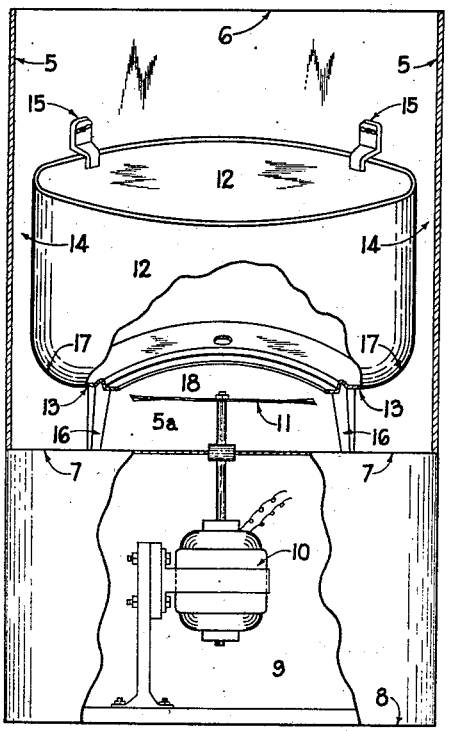
Figure 2:
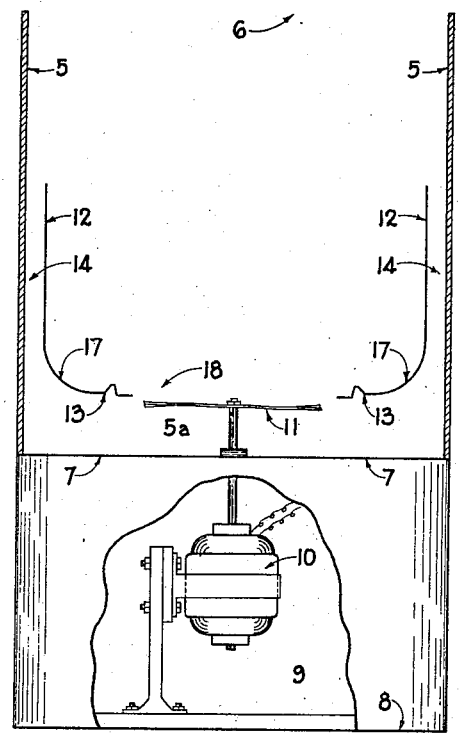
Fig. 2 is a vertical section, partly in elevation, of the device in Fig. 1, certain parts omitted, with the inner tank in diagrammatic outline.

Referring more particularly to Figs. 1 and 2, the present improvements comprise an outer tank 5, having an open top 6, and a closed bottom 7. The walls of the outer tank extend downwardly beyond the closed bottom, to provide a support base 8, and the space between bottom 7 and base 8 constitutes a housing 9, within which is supported an electric motor 10.

As illustrated, the armature of the electric motor extends (enveloped in suitable water-proof packing not shown) through the bottom 7 and terminates in a rotatable impeller 11, which is mounted in the lower chamber 5a of tank 5.

A baffle or inner tank 12, is concentrically mounted within the outer tank 5, with its walls spaced from the tank 5. It is apparent upon inspection of the drawings, that the bottom 13 of tank 12 is spaced from the bottom 7 of tank 5 and defines a chamber 5a, within which the impeller 11 is disposed. Communicating with that chamber, and immediately above it, there is an annular, uninterrupted and unrestricted channel or passageway 14, which is defined by the outer surface of the wall of tank 12 and the inner surface of the wall of tank 5.

Figure 5:
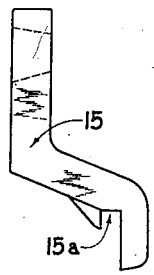
Fig. 5 is a side view, enlarged, of one of the three clamps for holding the inner tank in position. This is a full size view of the clamp.

In order to support the tank 12 above the bottom of tank 5, a tripod arrangement is provided consisting in three feet or legs 16, depending from and integral with bottom 13 of tank 12. Furthermore the two tanks 5 and 12 are (during use) immovably fixed together as a unit and in relative position, by means of clamps 15. A detail of this clamp is shown in Fig. 5, wherein a groove 15a is provided for receiving the upper edge of tank 12. Three such clamps 15 are provided and they are removably fastened by wing nuts, to the inner wall of tank 5. In operative position, these clamps preserve tank 12 in fixed, rigid position, with the feet 16 firmly pressed against the bottom 7 of tank 5. It is manifest that this construction creates and maintains the annular channel 14, as well as the chamber 5a.

It is also noteworthy that the top of the inner tank 12 terminates at a level substantially below the top of outer tank 5. The distance between the levels of the two tanks is about equal to the depth of inner tank 12, and the area therebetween is free of mechanical parts or other equipment. Accordingly all the space above, below and at the sides of inner tank 12 is free of obstacles, such as vanes, partitions, covers or other impediments to liquid flow.

In the preferred design, the inner tank 12 is provided with a curved or dished lower wall area 17, which is a continuation of the vertical wall portion and the bottom 13. This feature supplies a streamline contour for the swirling liquid and facilitates its discharge through aperture 18 in the bottom. A noticeable effect is thereby reflected in the burden on motor 10. The latter operates with greater ease and less heating, where inner tanks with this dished wall feature are employed.

The design of the impeller 11, also eases the load on the motor. In the preferred embodiment, the impeller is slightly less in its over-all length than the diameter of aperture 18. Moreover, the impeller 11 consists of a flat, rectangular strip of metal, which is given a slight twist throughout its length, and terminates in ends chamfered or bent slightly downwardly. This rectangular metal strip has four corners or angles, and preferably two diagonally opposite corner areas are bent downwardly to provide a "bite" into the liquid.

The dimensions of the inner tank 12 are such as to accommodate and support the conventional perforate wire egg basket in which up to twelve dozen eggs are customarily deposited in a cluster or bulk. The depth of the tank 12 is about equal to the height of the conventional basket (see Fig. 3).

It is understood, of course, that certain parts have been omitted from the drawings, which are conventional and play no part in the novelty of the present improvements. Such parts which have been omitted are draincocks, a heating unit, a thermostat, a manual switch for the motor and a removable screen for the aperture 18 to protect the impeller.

In the operation of the device, the liquid detergent is placed in the tanks until it reaches a level approximately equal to the top of the inner tank. The heating coil (not shown) in chamber 5a controlled by the thermostat (not shown) raises the temperature to a range between 110 and 120 degrees, where it is maintained by the operation of the thermostat. The basket of eggs to be washed may now be lowered into the device until it rests on the bottom of inner tank 12. In this step in the operation, the liquid will be displaced so that its level rises to about an inch above the top of inner tank 12. It is noteworthy, that the basket of eggs may be placed in the washer before the impeller 11 is actuated, or after it has been set in motion. The basket may likewise be removed at any time, whether the impeller is at full speed or not.

It is instructive, however, to observe the action of the washer before the basket is inserted, as well as afterwards. The impeller 11 is rotated by closing the manual switch, not shown, to the motor 10, and rotation of the impeller in the liquid detergent in chamber 5a creates a swirling, rotating, circulatory movement of the liquid detergent inside and outside of the inner tank 12, and at the full speed of the impeller, a whirlpool motion exists, resulting in the establishment of a vortex of liquid, the form of which is familiar. This vortex creates a pulling of some of the liquid downwardly through aperture 18 as well as elevation of some of the liquid in a spiral direction upwardly through channel 14, and its level is further raised slightly above the top of inner tank 12. As a consequence, before the egg basket is in place, there is a central cavity in the liquid existing in the center of the inner tank. The liquid which is drawn downwardly out of the center of the vortex is obviously forced upwardly in a spiral direction in channel 14, and accounts for the increase in level above referred to.

It has been found by experiment, that if a whirlpool of liquid is thus created in an ordinary tank of detergent (having no inner tank), and a basket of eggs is immersed therein, the action of the liquid on the eggs is indifferent and unsatisfactory, and does not effect a cleansing action on all the eggs. Moreover, the spiral, swirling action has a tendency to move the eggs relative to one another, resulting in some breakage. In the present improvements, however, by interposing an inner tank within the outer tank, within which the basket of eggs is enclosed or enveloped, the action of the whirlpool or vortex of liquid produces an unexpected result, which thoroughly cleans all eggs in the basket, not only on the perimeter but in the heart or center of the cluster of the entire gross of eggs which remain immersed. Moreover, the action of the liquid under these circumstances, tends to hold the eggs motionless in a cluster, so that breakage is eliminated. The reason for this result is ascribed to the design of the inner tank 12, and the creation of the clearance above, on the sides and bottom, between it and the outer tank.

Figure 3:
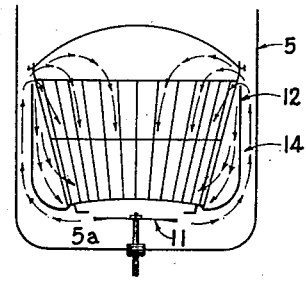
Fig. 3 is a diagrammatic outline of a portion of the embodiment illustrated in Figs. 1 and 2, showing an egg basket in outline, and the path of part of the liquid detergent.
Figure 4:
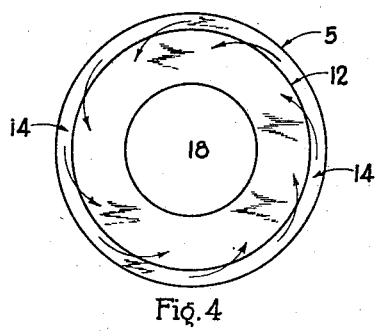
Fig. 4 is a diagrammatic top plan view of the illustrated embodiment, partially indicating the cascading, rotating path of the liquid detergent.

When the basket of eggs is placed in position and rests in the inner tank, the eggs themselves occupy a portion of the cavity in the vortex, which then become closed over with liquid, so that the entire basket of eggs is immersed in the swirling liquid within the inner tank. The presence of the eggs in the vortex area with a tank-wall surrounding the eggs, produces an effect on the liquid movement, not heretofore achieved. Obviously the presence of the eggs further displaces some of the liquid, so that the revolving impeller, which causes a turbulence in the chamber 5a beneath tank 12, forces the liquid upwardly in channel 14 in a spiral direction, causing it to cascade inwardly with a spiral or diagonal force, over the upper edge of the inner tank 5 and over the upper edge of the basket and thence into the basket. This cascading diagonal volume of liquid, driven in a circular inward and downward direction, produces a cleaning action on the eggs in the center and throughout the basket, not heretofore realized. This movement of the liquid is more than a mere fall or gravity flow. In Figs. 3 and 4 an attempt has been made to diagrammatically illustrate this movement of the liquid. In the latter view, the direction of the arrows is intended to illustrate the diagonal, spiral and downward cascading of the liquid from the annular channel 14 (formed by the concentric tanks) into the inner tank area where the basket of eggs rests. It is apparent from this view, that the liquid circulates downwardly within and without the basket, inside the tank.

It is believed that the downward motion of the liquid tends to hold the eggs together in a cluster while they are being washed, which assists in elimination of egg breakage. As previously noted, the inner tank 12 is provided with a dished lower wall 17, which is opposite the lower edge of the basket of eggs, where most difficulty is met in deriving thorough cleansing action. This rounded or dished portion promotes streamline flow. In the present improvements, the downward pull of the liquid by the impeller along this dished wall and through aperture 18, increases the scouring of the eggs by the detergent.

It has been found also in tests that an opening such as aperture 18 in the inner tank, which is slightly larger than the impeller, is best suited for creating the circulatory movement of the liquid. Upon reference to the drawings, it will be seen that the bottom 13 of tank 12 is recessed at the center, about this aperture, to provide a seat for a circular screen or mesh element (not shown) to protect the impeller. Surrounding that area, the bottom surface also, includes an annular raised lip, which is designed to facilitate seating of the egg basket, centrally of the tank. Drain holes, only one of which is shown in Fig. 1, may be provided to complete drainage of this inner tank.

It has further been developed in tests, that the uninterrupted annular cylindrical channel 14 constitutes a "spiral stairway" along which the liquid may "climb." As a result, the spiral upward cascading of the liquid, followed by the downward circular direction over the top and into the inner tank 12 is produced and contributes to the uniform cleansing of the eggs in the basket. It is obvious that location of partitions, barriers or vanes in this annular channel would arrest the spiral circular motion of the liquid and deprive it of its force and volume. The presence of such obstacles results in imprisonment of the liquid in vertical columns between such obstacles, and, as a result, the liquid is robbed of its energy, with the result that it weakly spills over the top of the inner tank, without applying any force or cleansing effect on the contents of the tank.

It is significant also that an area above the top of tank 12 likewise is kept free and unrestricted to a height substantially equal to the depth of tank 12. No baffles, impediments or deflectors are permitted in this region, so that full advantage may be taken of the direction and energy of the spiraling liquid.

The absence of any impediment to the liquid being moved by the impeller, beneath, beside and above the inner tank, contributes to the uniform application of the detergent to all units in the cluster of the eggs to be washed. The direction and force of the liquid are of paramount importance in supplementing the detergent characteristics of the liquid.

It is significant that the present improvements provide for cleaning, both by immersion and by liquid force at the same time. During the immersion, the dirt, etc., is being loosened by "soaking," while the force and direction of the liquid produces a scouring action on the eggs.

In the use of the washer, many advantages are derived, particularly the fact that by providing open tops on both tanks, a number of baskets of eggs may be washed, without interrupting the spiral movement of the liquid. For example one basket may be inserted, washed, and removed, and a second and third, and so on, without turning off the impeller. The movement of the liquid and the open-top tanks, permit ready access to the washer without suspension of operations or loss of time.

Moreover, after the cleansing operation is completed and the time arrives for removal of the basket from the tank, the open tops of the tanks not only permit the ready removal of the basket by its handle, but the operator may raise and lower the basket in and out of the liquid several times in order to rinse any residue of dirt from the eggs. The continual swirling and cascading motion of the liquid contributes materially to facilitate final cleansing of the eggs during this "ducking" movement. It has been found in practice that bits of feathers, straw, etc., which may be floating in the liquid, attach themselves to the eggs upon withdrawal of the basket, and some operators, after withdrawal, have been called upon to direct a stream of water from a hose, on the basket to remove this residue. In the present improvements the use of any auxiliary equipment is unnecessary due to the ease with which this "ducking" operation is permitted.

Although the inner tank is rigidly fixed within the outer tank during periods of operation and when in storage, nevertheless the provision of wing nuts for securing clamps 15 permit ready removal of the inner tank for flushing out and cleaning all parts of the equipment.

It is apparent that the form, shape and dimensions of the tanks, impeller, etc., may be varied without departing from the scope of the present improvements.

What I claim is:

An egg washer comprising a cylindrical outer tank with its axis vertically disposed, said outer tank having an open top open the full diameter thereof and a closed bottom, a cylindrical inner tank suspended within and spaced from said outer tank with its axis coinciding with the axis of said outer tank, said inner tank having an open top open the full diameter thereof spaced below the open top of said outer tank and a bottom opening of reduced diameter at the bottom thereof, an inwardly extending flange on the bottom of said inner tank around said bottom opening, a removable egg basket, means on said flange for centering and supporting said basket over said bottom opening, a rotary impeller below said bottom opening mounted for rotation about the axis of said outer tank, said flange curving downwardly and inwardly to a rim portion surrounding said bottom opening, thereby streamlining the flow of said liquid out said inner tank to said impeller therebelow, said impeller being rotatable in one direction at constant speed to impart a steady spiral flow of a liquid in said washer in the same rotary direction throughout said egg washer, said flow being spirally downward and inward in said inner tank to flow in whirlpool fashion through said egg basket, spirally outward under said inner tank, spirally upward therearound, and spirally inward over the top thereof.

References Cited in the file of this patent

UNITED STATES PATENTS

| | | |
|---|---|---|
| 425,703 | Schmidt | Apr. 15, 1890 |
| 2,374,500 | Reading | Apr. 24, 1945 |
| 2,482,319 | Casse | Sept. 20, 1949 |
| 2,498,734 | Bozanich | Feb. 28, 1950 |